US009537807B2

(12) United States Patent
Bledsoe et al.

(10) Patent No.: US 9,537,807 B2
(45) Date of Patent: Jan. 3, 2017

(54) AUTOMATICALLY TRANSITIONING A USER FROM A CALL TO ACTION TO AN ENROLLMENT INTERFACE

(71) Applicant: The Motley Fool Holdings, Inc., Alexandria, VA (US)

(72) Inventors: Christopher Lee Bledsoe, Alexandria, VA (US); Jeremy Cecil Phillips, Alexandria, VA (US); Austin Taylor Smith, Alexandria, VA (US); Michael James Gurtzweiler, Woodbridge, VA (US); Jeffrey Young Lee, Arlington, VA (US); Laura May Cavanaugh, Washington, DC (US); Maxwell Alfred Keeler, Alexandria, VA (US); Eli Thomas Robbins, Alexandria, VA (US); Spencer Lewis Holleman, Arlington, VA (US)

(73) Assignee: SILICON VALLEY BANK, Santa Clara, CA (US)

( * ) Notice: Subject to any disclaimer, the term of this patent is extended or adjusted under 35 U.S.C. 154(b) by 470 days.

(21) Appl. No.: 14/079,967

(22) Filed: Nov. 14, 2013

(65) Prior Publication Data
US 2015/0134752 A1 May 14, 2015

(51) Int. Cl.
*G06F 15/16* (2006.01)
*H04L 12/58* (2006.01)

(52) U.S. Cl.
CPC .................................. *H04L 51/18* (2013.01)

(58) Field of Classification Search
USPC ........................................ 709/206–207, 224
See application file for complete search history.

(56) References Cited

U.S. PATENT DOCUMENTS

2007/0150573 A1* 6/2007 Kitchen ............... G06Q 30/02
709/223
2009/0191855 A1 7/2009 Forrester et al.
(Continued)

FOREIGN PATENT DOCUMENTS

KR 10-2001-0113199 A 12/2001

OTHER PUBLICATIONS

International Search Report and Written Opinion of the Searching Authority directed to related International Patent Application No. PCT/US2010/043140, mailed Oct. 14, 2014; 10 pages.
(Continued)

*Primary Examiner* — Philip B Tran
(74) *Attorney, Agent, or Firm* — Sterne, Kessler, Goldstein & Fox P.L.L.C.

(57) ABSTRACT

Disclosed herein are system, method, and computer program product embodiments for automatically transitioning a user from a call to action (CTA) to an enrollment interface. An embodiment operates by receiving a request from a user's device to display web content. The requested web content is displayed along with a CTA. When the CTA is selected by the user, an e-mail client associated with the user's device automatically opens, generates an electronic message based on the selected CTA, and populates a recipient address and a code associated with the CTA within the electronic message. Upon its receipt, the electronic message is processed by enrolling the user in a campaign associated with the CTA based on the code and the user's e-mail address. An electronic message is generated and sent to the user's e-mail address that contains a first hyperlink to the campaign associated with the CTA and a second hyperlink to an associated privacy policy.

21 Claims, 4 Drawing Sheets

(56) References Cited

U.S. PATENT DOCUMENTS

| | | | |
|---|---|---|---|
| 2009/0204901 A1 | 8/2009 | Dharmaji et al. | |
| 2009/0327056 A1* | 12/2009 | Fiechter | G06Q 30/0207 705/14.1 |
| 2011/0052144 A1 | 3/2011 | Abbas et al. | |
| 2012/0150631 A1* | 6/2012 | Root | G06Q 50/01 705/14.49 |
| 2012/0278142 A1 | 11/2012 | Li | |
| 2012/0310927 A1* | 12/2012 | Johnson | G06F 17/30864 707/723 |
| 2013/0067022 A1* | 3/2013 | Andersson | G06F 3/0482 709/217 |

OTHER PUBLICATIONS

English-language abstract of Korean Patent Application No. 10-2001-0113199 A; 4 pages.

* cited by examiner

AUTOMATICALLY TRANSITIONING A USER FROM A CALL TO ACTION TO AN ENROLLMENT INTERFACE

BACKGROUND

A call to action, or CTA, may be a banner, button, graphic, and/or text etc., displayed on a website that prompts a user to select it and continue down a conversion funnel. Conversion refers to the objective associated with a particular CTA, such as, for example, completing a purchase, opting-in to a service, and/or satisfying a goal of the website. A funnel refers to the fact that conversion rates tend to decrease sharply as the number of steps required for the user to reach the conversion objective increase.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

E-mail marketing is an effective way to connect interested users with products and/or services. Once an e-mail address is associated with an interested user, products and services may be marketed directly to the user via e-mail. If information about the user can be determined, targeted product and service offerings may be provided. One marketing objective may be to obtain an e-mail address in exchange for providing the user a product or service. However, e-mail marketers often struggle to obtain e-mail address information from interested users. For example, a user casually browsing a website offering access to a featured product may follow a link to the product but turn back if asked to enter an e-mail address. This problem is particularly acute in mobile computing environments, e.g., smartphones, with limited input and navigation options as well as small screens. This also applies generally to browser environments that present hurdles to performing data entry. Embodiments are described herein with respect to this example application for illustrative purposes, but such embodiments are not limited to this example application.

In the example above, the link to the product may be considered a call to action, or a CTA. A CTA may take the form of a banner, button, graphic, and/or text etc. displayed on a website that prompts a user to select it and continue down a conversion funnel. A conversion funnel often reflects the fact that while a large number of users may initially follow the link, far fewer will complete the task of entering an e-mail address (e.g., first into a form, possibly confirming the address again in a second field, then submitting the form, potentially being required to await confirmation, and finally to select a validation link). Indeed, conversion rates tend to decrease sharply as the number of steps required for the user to reach the conversion objective increase. As a result, e-mail marketers lose out on important opportunities to establish relationships with interested users.

Also, certain types of marketing may first require express permission from the user in the form of an opt-in. After the opt-in occurs, the marketer may send materials or messages until the recipient opts-out. In the United Kingdom, for example, an opt-in is required for e-mail marketing by the Privacy and Electronic Communications Regulations (EC Directive, 2003). Many such regulations exist, which frequently vary from country to country. Such regulations may challenge transnational marketing efforts by calling upon providers to adapt offerings, as well as customize policies, e.g., privacy policies, terms of service, enrollment, etc., depending on the national origin of the requesting user device.

Provided herein are system, method and/or computer program product embodiments, and/or combinations and sub-combinations thereof, for automatically transitioning a user from a call to action (CTA) to an enrollment interface.

In an example embodiment, requiring the user to enter an e-mail address may be bypassed by displaying a CTA that, when selected, automatically launches an e-mail client associated with the requesting device, generates an e-mail message based on the selected CTA, and populates recipient and subject line fields with an address and a code associated with the selected CTA. By automatically generating an enrollment interface, such as an opt-in electronic message that includes an associated code, the user has been relieved of the burdensome task of manually inputting e-mail address information. Since the e-mail client will have authenticated its user, validation is unnecessary. Also, the code associated with the e-mail message may be tied to contextual information about the CTA (e.g., subject matter, metadata, context, analytics). The message itself may also include a disclosure informing the user that, by sending the e-mail message, the user will opt-in to the marketing campaign. Such a disclosure may be tailored to the user and/or the CTA based on the detected national origin of the requesting user's device. The user may then elect to opt-in by affirmatively sending the automatically generated message using their e-mail client. Thus, the steps needed to enroll in the campaign are substantially reduced.

Figure 1:
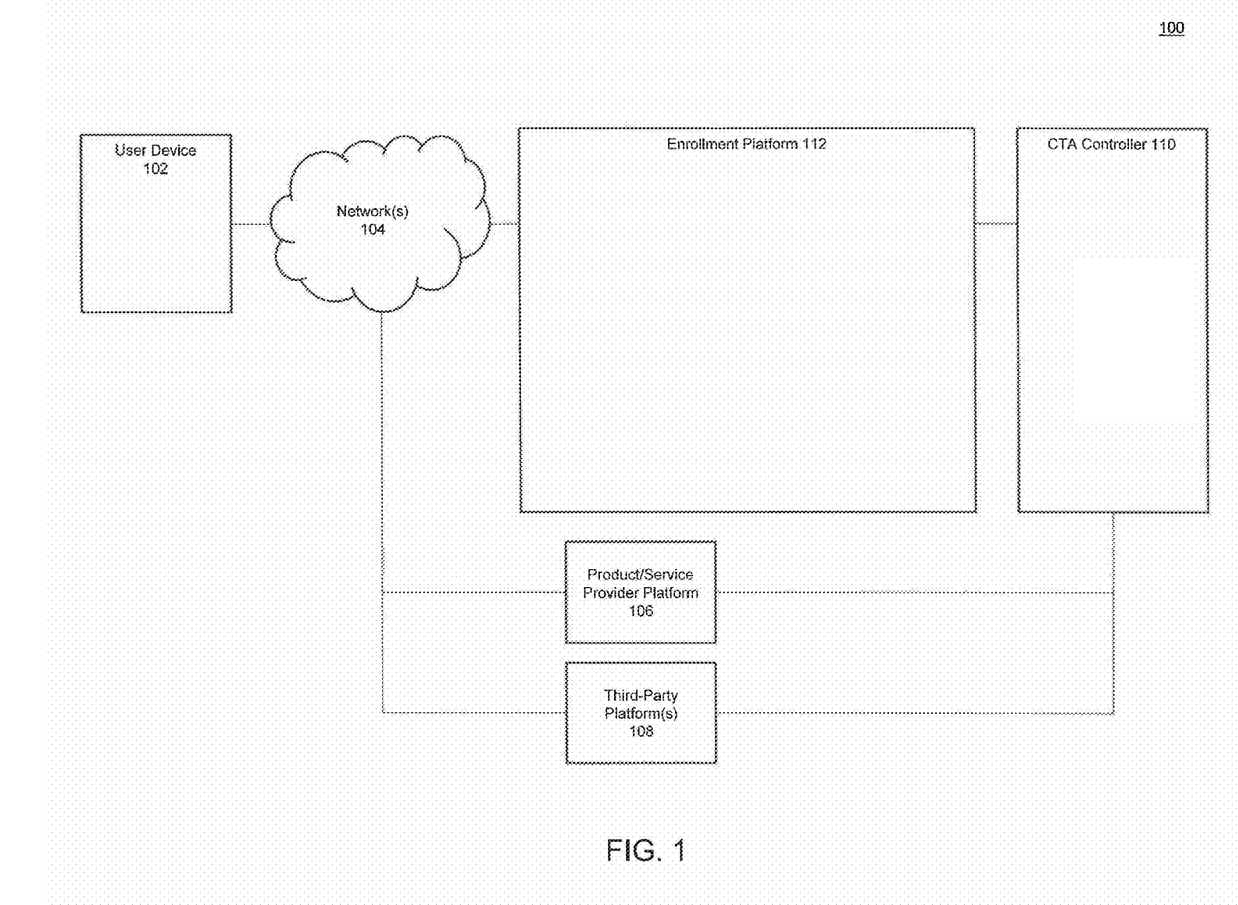
FIG. 1 is a block diagram of a enrollment system that includes server architecture for automatically transitioning a user from a CTA to an enrollment interface, according to an example embodiment.

FIG. 1 shows a system architecture 100 for automatically transitioning a user from a CTA to an enrollment interface. In an example embodiment, system architecture 100 includes one or more user devices 102 connected by one or more networks 104 to one or more of a product and/or service provider platform 106, one or more third-party platforms 108, and/or an enrollment platform 112. Enrollment platform 112 is connected to a CTA controller 110 which is connected to provider platform 106 and/or third-party platform 108. One or more users may be associated with user device 102. A user may operate user device 102 to access and/or interact with content on provider platform 106 and/or third-party platform 108. Provider platform 106 and third-party platform 108 may be one or more web sites, domains, and/or other web platforms associated with providing content to users via network 104. User device 102 may be operated by an individual, organization, and/or enterprise and may be identified in various ways, for example, by a name, alias, header data, e-mail address, unique identifier (ID), domain, electronic signature, Internet protocol (IP) address, and/or any other type of identifier. By way of example and not limitation, user device 102 may be a mobile device, e.g., smartphone or cellular phone, a personal computer (PC), kiosk, or other networked device configured to render content.

In an example embodiment, network 104 includes one or more networks of one or more network types, such as, for example, the Internet, comprised of one or more LANs, WANs, wireless (e.g., WiFi) and/or telecommunications networks etc. Network 104 may encompass connections between some or all components in system architecture 100, such as, for example, as between provider platform 106, third-party platform 108, enrollment platform 112, and/or CTA controller 110. In an example embodiment, system architecture 100 may be distributed over one or more networks and may operate as cloud computing architecture. Cloud computing may include distributed network architecture for providing one or more of software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), and/or integration platform as a service (IPaaS), etc.

Figure 2:
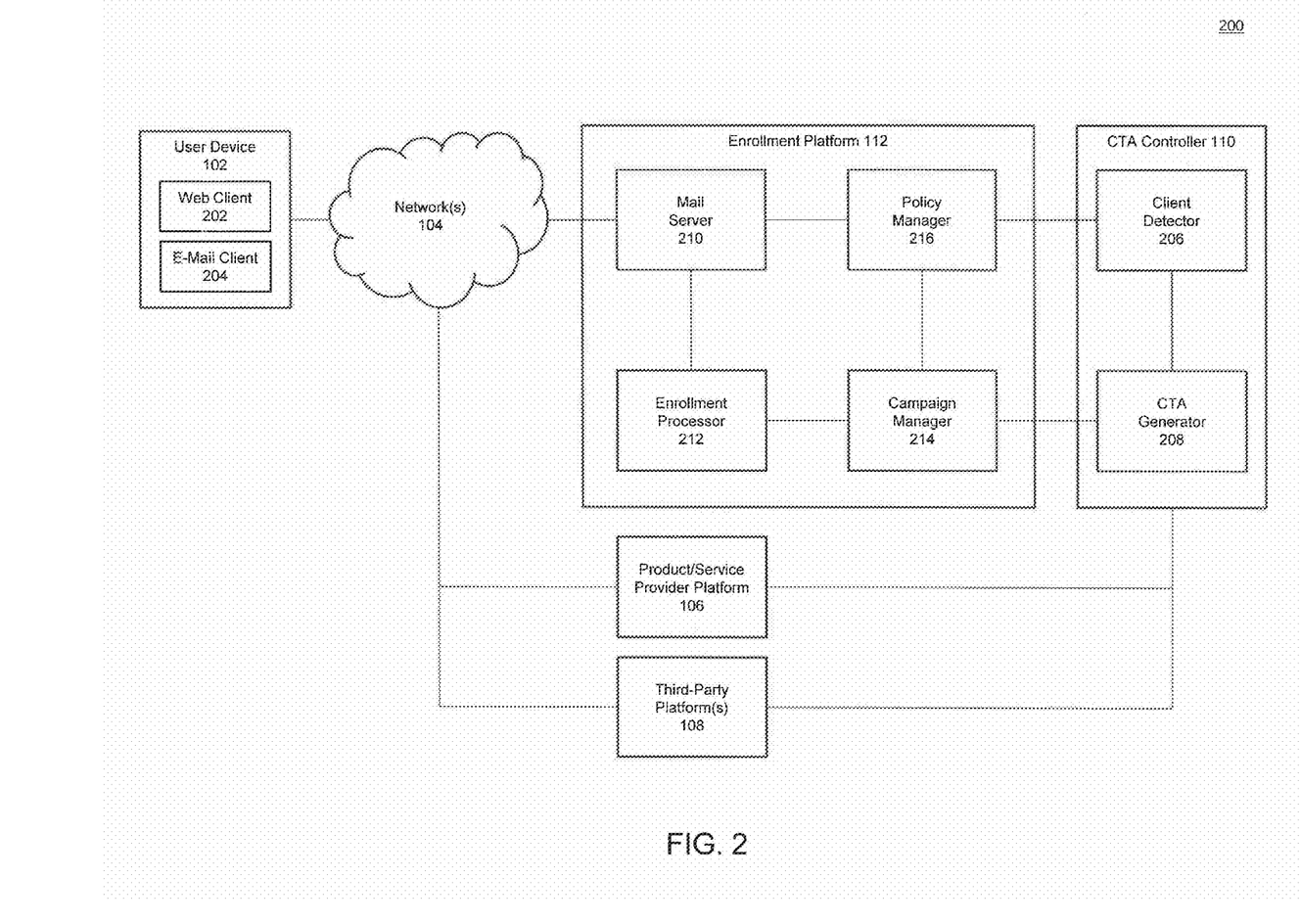
FIG. 2 is an expanded view of the enrollment system that includes subcomponents of the system configured to automatically transition a user from a CTA to an enrollment interface, according to an example embodiment.

FIG. 2 shows an expanded view of system architecture 100. For example, FIG. 2 shows that user device 102 may include a web client 202 and/or an e-mail client 204. In an example embodiment, user device 102 is operated by a user to browse web content using web client 202 and/or receive and send electronic communications over network 104 using e-mail client 204. User device 102 may include one or more of an operating system and applications running on an operating system or in web client 202. User device 102 may be configured, with or without a user's selection, to designate e-mail client 204 as the default for receiving, viewing, and/or sending electronic communications. E-mail client 204 may be uniform across all instances of user 102 or may be varied based on the source, model and/or type of user device 102, factory settings of user device 102, and/or other programmable characteristics that may be associated with sending, receiving, and/or viewing e-mails on user device 102. E-mail client 204 may be provided as a service via the cloud or any other communications platform. For example, e-mail client 204 may operate within web client 202 and/or may be updated based on remotely stored data.

In an example embodiment, e-mail client 204 includes user authentication, such as, for example, password protection. One of ordinary skill in the art would understand that systems and methods for transmitting secure electronic communications on e-mail client 204, and/or at the level of user device 102, may be implemented in various ways, e.g., using a key, passcode, fingerprint reader, security question(s), unique tasks, etc. User authentication may identify a name and/or alias associated with an author of an electronic communication, e.g., by an indicator such as an address, source/origin indicator, etc. Such identification may be presented to a recipient as data recognizable to the receiving server, client, and/or other communication interface, e.g., in header data, metadata, etc.

In an example embodiment, e-mail client 204 uses Simple Mail Transfer Protocol (SMTP). A sender communicates with a receiver by issuing commands and/or supplying data over a data channel, e.g., a Transmission Control Protocol (TCP) connection. Such data may be processed by one or more subcomponents of enrollment platform 112.

In an example embodiment, enrollment platform 112 comprises a mail server 210, an enrollment processor 212, a campaign manager 214, and a policy manager 216. An SMTP session may include one or more commands originated by e-mail client 204 (e.g., the initiating agent, sender, or transmitter) and corresponding responses from the mail server 210 (e.g., listening agent, receiver, etc.). In this manner, a session comprising one or more SMTP transactions may be opened and data may be exchanged.

In an example embodiment, web client 202 comprises an application operable to retrieve, present, and/or traverse information resources on the World Wide Web (WWW). Web client 202 may access information resources provided by web servers connected to private networks and/or a file in a file system. Web clients include browsers such as, for example, Chrome, Firefox, Internet Explorer, Opera, and Safari. An information resource may be identified by a Uniform Resource Identifier (URL) (e.g., web page, image, video or other piece of content). Web client 202 uses the Hypertext Transfer Protocol (HTTP) to render distributed, hypermedia, web content, and/or other types of information, such as content provided and/or hosted by provider platform 106 and/or third-party platform 108.

In an example embodiment, hypertext/media includes structured text and/or media taking the form of one or more hyperlinks. Hyperlinks that are present in resources such as provider platform 106 and/or third-party platform 108 facilitate web navigation in a manner that would be understood by one or ordinary skill in the relevant art(s). Provider platform 106 and/or third-party platform 108 render web pages using one or more markup languages, such as the HyperText Markup Language (HTML) and/or eXtensible markup language (XML), e.g., as XHTML, to display web content in web client 202.

For example, HTML is comprised of elements represented as tags which may be processed for display by web client 202. The anchor tag <a> may be configured to specify an e-mail address by setting the href property to the value of the target (e.g., <a href="mailto:target@mail.com"> Click Here for a Free Trial!</a>. In this example, what is displayed to the user is a hyperlink of text stating "Click Here for a Free Trial!" which, in this example, comprises a CTA, e.g., an advertisement, promotion. When selected, this hypertext effectuates a hypertext transfer of the specified address to e-mail client 204, which in turn automatically populates the e-mail address of the recipient, the subject line, and/or the body fields of a new message using the functionality of e-mail client 204.

In an example embodiment, user selection of the "mailto" anchor automatically triggers e-mail client 204 to launch and/or be brought into focus from a background state and generate a new e-mail message in accordance with one or more of the subject and body parameters specified in the "mailto" anchor. For example, web client 204, displays such anchors when rendering the content of provider platform 106 and/or third-party platform 108. Provider platform 106 may be a domain associated with the provider and third-party platform 108 may be a website that displays advertisements sponsored by the provider to appear on third-party sites. For example, the following specification of <a href="mailto:target@mail.com?subject—Campaign 8675309&body=Hit send and opt-in to receive a free trial and enroll for special offers in related products."> Click Here for a Free Trial!</a> is operable to automatically generate a new electronic message addressed to the recipient "target@mail.com" with the subject line "Campaign 8675309" and the body of the e-mail displaying "Hit send and opt-in to receive a free trial and enroll for special offers in related products." As shown in this example, "mailto:" "subject=" and "body=" specify that a particular e-mail address, subject line, and text will appear in the resulting electronic message. Configuring an anchor associated with a particular CTA in this manner is one way to effectuate automatic generation of an e-mail-based enrollment interface. Embodiments described herein are not limited to e-mail enrollment interfaces and may be implemented to be displayed directly in a site, e.g., as rendered in web client 202, such as, for example, on a landing page, module, or other user interface.

In an example embodiment, CTA controller 110 comprises a client detector 206 and/or a CTA generator 208. By way of example, not of limitation, a CTA is embedded in a web page provided on provider platform 106 and/or third-party platform 208, e.g., as a banner advertisement. A web page displayed on such platforms may be divided up into discrete modules of content, e.g., subsections, <div> tags, which may be configured to asynchronously swap in/out different versions of a particular CTA depending on what type, model, and/or settings are present on web client 202 and/or are associated with the source, origin, and/or request types generated by user device 102. By way of example, not limitation, this may be implemented using asynchronous JavaScript, XML and/or AJAX. In an example embodiment, client detector 206 processes requests for web pages by user device 102 and identifies characteristics of the requesting user device 102 based on available data such as, for example, by reading and/or querying HTTP headers that a browser, such as web client 202, sends as part of the request. Such headers are processed by client detector 206 to uniquely identify a browser or model and/or its properties. One property useful for this purpose is the user-agent header. HTTP protocol may be used to serve content to user agents with different capabilities. Such methods of device detection may use pattern-matching techniques to map headers to devices and associated properties. Other methods of determining user device 102 properties include determining the screen-size and/or the resolution associated with the display area of user device 102, displaying one or more options to be selected by a user to indicate a type of device and processing user inputs, processing cookies, etc. In an example embodiment, client detector 206 may determine a geographic location associated with user device 102, e.g., by processing an IP address, a routing path, an option selected by a user, a domain name, etc. In this manner, a request by user device 102 on provider platform 106 and/or third-party platform 108 allows client detector 206 to compile a profile of user device 102 based on, for example, the type of device, model of browser, and/or geographic location.

In an example embodiment, once such user characteristics are determined, CTA generator 208 retrieves a corresponding CTA and/or dynamically configures a CTA based on the characteristics and/or other criteria stored and managed on CTA controller 110 in one or more reference databases. In an example embodiment, a CTA may be associated with one or more campaigns. A campaign, like a conversion objective, comprises one or more marketing initiatives tied to one or more offerings. Campaigns may be directed to a particular product, service, and/or subscription. Campaigns may comprise advertising to improve awareness and/or track user interest in an associated message.

In an example embodiment, campaign manager 214 stores and/or manages data associated with particular campaigns. By way of example, not limitation, a provider may design a marketing initiative featuring access to a premium financial report, e.g., a report providing expert analysis of market conditions, a series of picks, or other personal finance products. Such a product, offering, subscription etc. may take on the form of a link to one or more areas of provider platform 106, e.g., a downloadable document, a subsection of a web site, a secured subdomain etc. Such a campaign is indexed by campaign manager 214 and associated with a campaign identifier, such as a campaign ID, number, code, and/or signature. The campaign ID associated may be accessed for processing by CTA generator 208 when generating a hypertext/media CTA for display on provider platform 106 and/or third-party platform 108. Embedding a hypertext CTA displaying the phrase "Click Here for a Free Trial!" into one or more subsections of a web page allows a user of user device 102 to select the CTA and initiate automatic transition to an enrollment interface.

In an example embodiment, client detector 206 captures geographic information associated with user device 102. Such geographic information may be generalized to the level of national origin and/or a jurisdiction associated with user device 102, for example, the domain associated with the requested content on provider platform 106 and/or third-party platform 108, such as, for example, based on the country code extensions as well as any second and/or third level domain names associated with each country (e.g., ".co.uk," ".fr," ".hk," ".cn,"). As a result, a general national origin characteristic may be captured by client detector 206. In an example embodiment, an enrollment interface, such as an e-mail based enrollment interface, may be customized based on a national origin associated with the requesting user device 102. Policy manager 216 stores and/or manages various user agreements, terms of service, privacy policies, and/or other communications. Policy manger 216 associates each policy with a corresponding jurisdiction. Policy manager 216 may be configured to map one or more policies to one or more jurisdictions (e.g., a policy corresponding to a user determined to be requesting content from a .co.uk domain may be the same as a policy corresponding to a user determined to be requesting content from a .hk domain, thus the same policy may be associated with both jurisdictions).

In an example embodiment, CTA generator 108 accesses policy manager 216 to incorporate links to one or more corresponding policies based on geographic detection data captured by client detector 206. For example, based on characteristics captured by client detector 206 and an associated mapping to policy manager 216, based on a given campaign ID, CTA generator 208 configures a hypertext/media CTA to automatically transition a user from selection of the CTA on provider platform 106 and/or third-party platform 108 to an enrollment interface which may include one or more links and/or display text/media corresponding to a given campaign and/or corresponding policy. In an example embodiment, such a CTA may be swapped in/out dynamically, for example and without limitation, by using an AJAX implementation and/or other scripting languages.

Association between a given campaign and one or more policies, as managed on enrollment platform 112, may be useful where jurisdictions require varied disclosures and/or invoke different policies depending on the campaign. Using CTA generator 208 to configure the CTA allows a product, service, and/or subscription provider to customize as well as automate the process of presenting a user with the appropriate information at the appropriate time. In an example embodiment, a user is automatically transitioned to an enrollment interface by selecting a hypertext/media CTA.

Based on the configuration of the CTA, a user may be presented with various disclosures following an opt-in election.

By way of example, not limitation, CTA generator 208 outputs a hypertext/media CTA configured to automatically transition a user to an e-mail based enrollment interface which automatically populates address, subject line, and body fields in a new message in e-mail client 204. The address field is automatically addressed to mail server 210. The subject line is automatically populated with the campaign ID associated with the CTA. The body of the message is automatically populated with the phrase "I wish to opt-in to receive additional offers and access this content." Additional language may be displayed in the body depending on whether policy manager 216 and/or client detector 206 have caused CTA generator 208 to configure the CTA to instantiate such language in the body of the new message and/or to display such content elsewhere (e.g., in a pop-up, web page, landing page etc.). The user may then opt to send the electronic communication. Since the new message was automatically addressed to mail server 210 and sent from authenticated e-mail client 204, mail server 210 receives and stores the message as an opt-in request.

In an example embodiment, enrollment processor 212 polls mail server 210 for incoming messages to process. Mail server 210 may also push notifications to enrollment processor 212. Enrollment processor 212 in turn parses incoming messages for campaign ID information and associated data. For example, enrollment processor 212 may parse configurations and properties associated with the hypertext/media CTA which caused initiation of enrollment and transition to the enrollment interface. As such, enrollment processor 212 may query campaign manager 214 and/or policy manger 216 to determine data to supply in a corresponding response. For example, enrollment processor 212 may determine based on the campaign ID that the associated e-mail address has opted-in to a particular campaign (e.g., a subscription list) and/or that the associated e-mail address is to be sent a response providing the requested product, service, subscription, etc. and/or a corresponding policy (e.g., link to a privacy policy, terms of service, disclosure). Once determined, enrollment processor 212 may generate such response and cause mail server 210 to send the response to user device 102. In an example embodiment, such a response may include further CTA(s) generated by CTA generator 208, as previously discussed.

Figure 3:
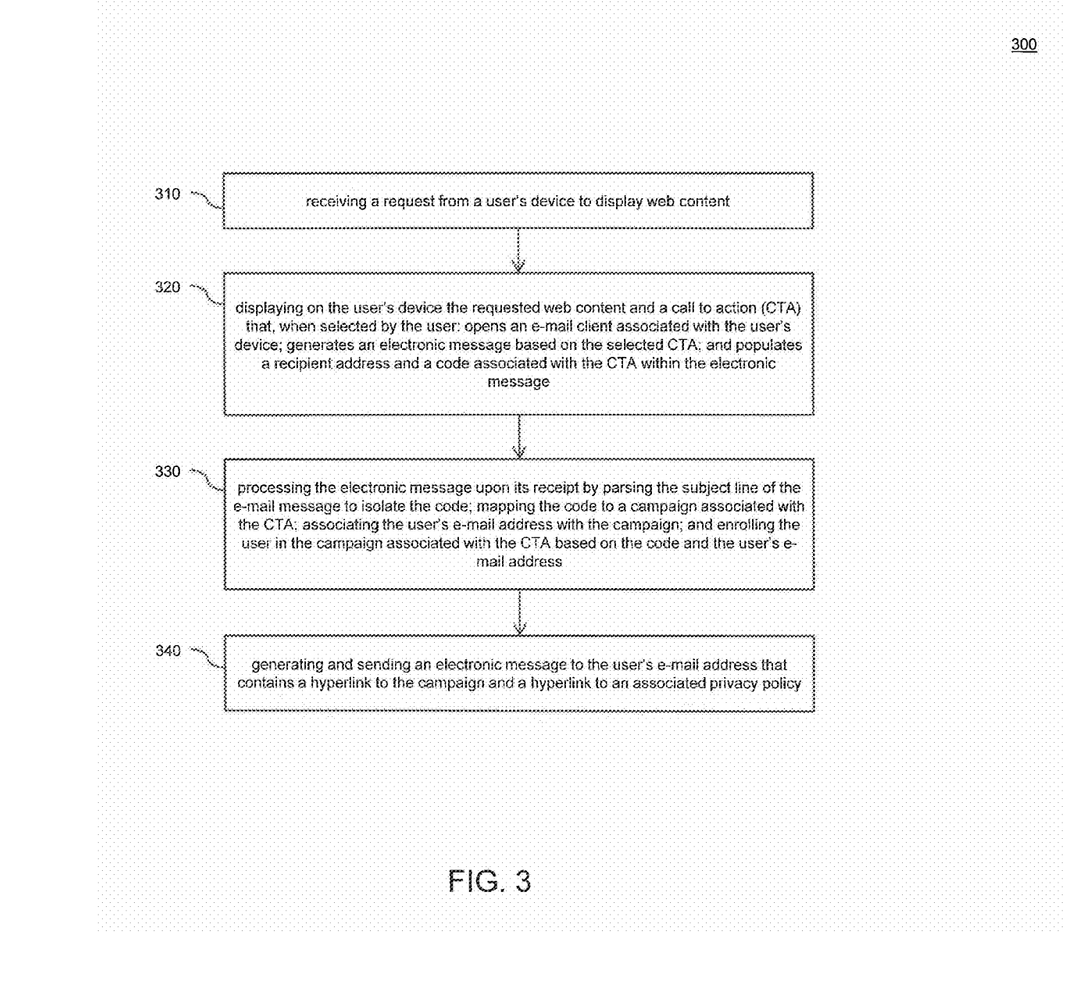
FIG. 3 is a flowchart illustrating a process for automatically transitioning a user from a CTA to an enrollment interface, according to an example embodiment.

FIG. 3 is a flow diagram showing a method for automatically transitioning a user from a call to action (CTA) to an enrollment interface, according to an example embodiment. Method 300 begins at step 310, where a request is received from a user's device to display web content. User device 102 includes web client 202 which is operable to render web content requested from provider platform 106 and/or third-party platform 108. Web content may include a CTA configured by CTA generator 208. One or more sections of web content may be swapped in/out to display a particular CTA, for example, a CTA associated with particular campaign ID. Receiving may include detecting a type of web client and a national origin associated with user device 102. Receiving may include selecting web content for display based on the detected type of web client 202 and/or the national origin of user device 102. Client detector 206 is operable to detect the type of web client 102 and/or national origin or user device 102. In response to such detection, CTA generator 208 may select or dynamically configure a CTA for display. Such a CTA may be embedded in the requested web content, e.g., in an advertisement for display on third-party platform 108. Selecting may include querying one or more reference databases and selecting a CTA and/or surrounding web content based on the web client type and/or the national origin of the request and/or user device 102. Criteria stored and/or managed by policy manager 216 may dictate a particular configuration of the CTA. Criteria stored and/or managed by campaign manager 214 may dictate a particular configuration of the CTA. Selecting may include using a scripting language such as AJAX to swap in/out sections of web content and displaying the selected web content and/or the embedded CTA based on web client type and/or national origin.

In an example embodiment, in step 320, the requested web content is displayed on user device 102 along with the CTA. When the CTA is selected by the user, e-mail client 204 associated with the requesting device automatically: opens, generates an electronic message based on the selected CTA, and populates a recipient address (e.g., one or more addresses which receive incoming messages at mail server 210) and/or a code associated with the selected CTA within the electronic message, e.g., the campaign ID. Such a CTA may be embedded in a display advertisement featured on third-party platform 108.

In an example embodiment, user device 102 comprises a mobile device equipped with a default e-mail client, such as e-mail client 204. The default e-mail client may be configured to generate an electronic message in response to selection of the CTA. The CTA may be hypertext or hypermedia. The hypertext/media CTA may be configured to include one or more "mailto" anchors. Selection of the CTA's "mailto" anchor may cause e-mail client 204 to launch, take focus, and/or open from a background state to generate the electronic message. The CTA may be configured to express such behaviors based on instructions set as properties of the "mailto" anchor. CTA generator 208 may configure such anchors based on criteria managed by campaign manager 214 and/or policy manager 216 to correspond to a particular campaign. For example, the subject line of the electronic message may include the campaign ID associated with the displayed and selected CTA. A custom message may be displayed in the electronic message based on the campaign ID, e.g., to provide a customized disclosure based on web client type and/or national origin.

In an example embodiment, in step 330, the electronic message is processed upon its receipt by parsing the subject line of the e-mail message to isolate the code, mapping the code to a campaign associated with the CTA, associating the user's e-mail address with the campaign, and enrolling the user in the campaign associated with the CTA based on the code and the user's e-mail address. For example, when the user elects to send the electronic message automatically generated at step 320, the electronic message is sent to and received by mail server 210. Upon receipt by mail server 210, the electronic message may be processed by enrollment processor 212 which polls mail server 210 for messages to parse and/or receives push notifications from mail server 210 to perform this function.

In an example embodiment, upon mapping the code, e.g., campaign ID associated with the CTA, a policy or other type of disclosure may be selected. By way of example not limitation, one or more policies, e.g., a privacy policy, may be selected from policy manager 216 based on the national origin detected by client detector 206. The criteria for which policy to select may be determined by policy manager 216 alone or in coordination with campaign manager 214. For example, a given campaign ID may call for a specific policy, disclosure, set of terms, etc. to be displayed to the user and/or sent to the user in a response or reply message, depending on the detected national origin of user device 102. Campaign manager 214 may point directly to policies stored in policy manger 216. In an example embodiment, campaign manager 214 includes one or more indicators associated with the campaign, e.g., noting that the campaign is of a type or class that is regulated by privacy, finance, consumer protection etc. laws of a particular nation. Such an indicator is processed by policy manager 216 to determine policy specifications, e.g., communication with the user, service of a link to more information, confirmation of an opt-in status, etc.

In an example embodiment, in step 340, an electronic message is generated and sent to the user's e-mail address. The electronic message contains a first hyperlink to the campaign, e.g., the target product, service, subscription, etc., and a second hyperlink to an associated policy, e.g., privacy policy, terms of service, link to further information etc. An electronic message is one way to transmit further communications to the user. Other ways or complimentary ways of engaging in such communications are also contemplated, e.g., displaying confirmation of the enrollment, related policy information, links, more CTAs on a web page displayed in web client 202. Other or complimentary ways of delivering or making campaign deliverables available to a user are contemplated aside from providing a hyperlink to the campaign product, service, subscription etc., e.g., direct downloading of the campaign deliverable, attachment of the campaign deliverable to a communication, access granted to a restricted subdomain. Such delivery may be specified by campaign manager 214 and implemented on provider platform 106 and/or third-party platform 108.

Example Computer System

Figure 4:
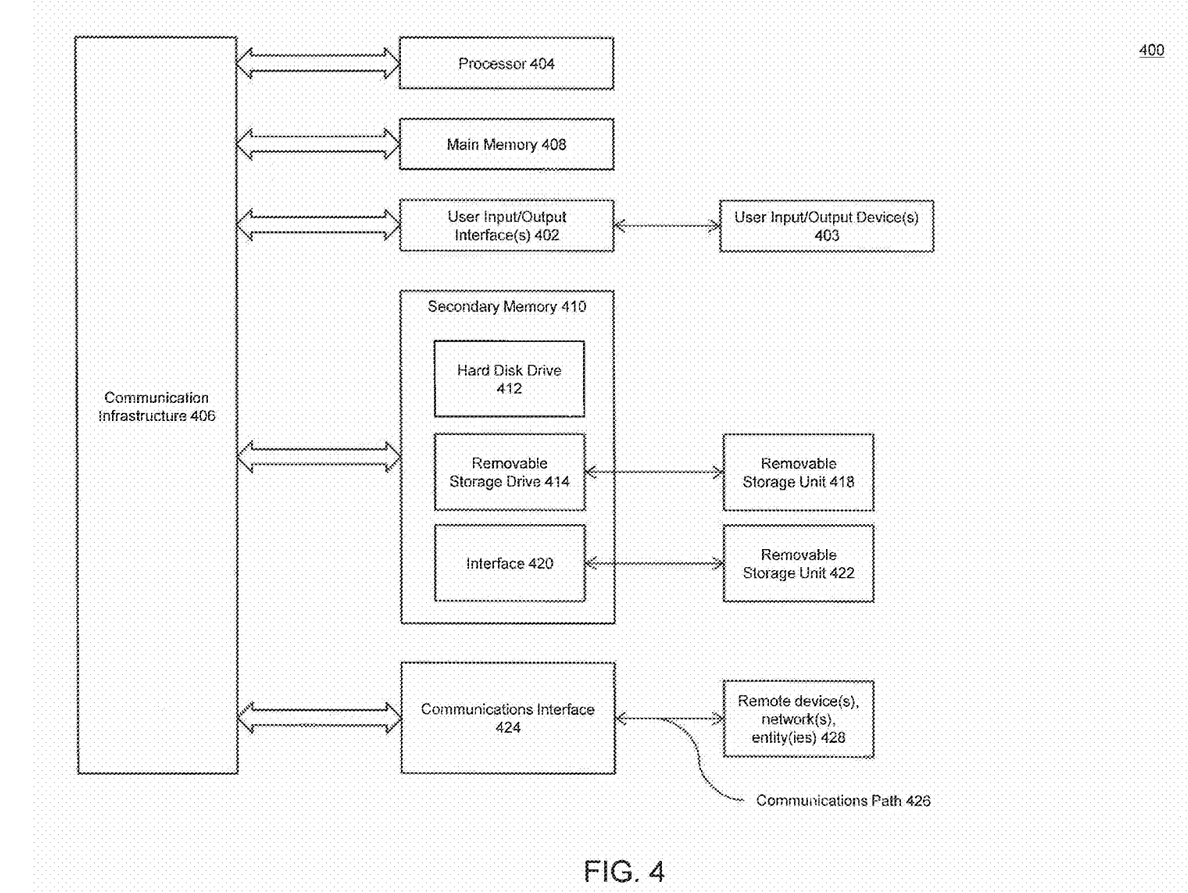
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

Computer system 400 also includes user input/output device(s) 403, such as monitors, keyboards, pointing devices, etc., which communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). Communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
   receiving a request from a user's device to display web content;
   displaying on the user's device the requested web content and a call to action (CTA) that, when selected by the user: opens an e-mail client associated with the user's device; generates an electronic message based at least in part on the selected CTA; and populates a recipient address and a code associated with the CTA within the electronic message; and
   processing the electronic message upon its receipt by enrolling the user in a campaign associated with the CTA based at least in part on the code and the user's e-mail address, wherein the campaign corresponds to a jurisdiction; and
   generating and sending an electronic message to the user's e-mail address, the electronic message comprising a first hyperlink to the campaign associated with the CTA and a second hyperlink to an associated privacy policy corresponding to the jurisdiction.

2. The method of claim 1 wherein the user's device comprises a mobile device equipped with a default e-mail client, the default e-mail client configured to generate an electronic message in response to selection of hypertext or hypermedia including a mailto anchor.

3. The method of claim 1, the receiving further comprising:
   detecting a type of web client and a national origin associated with the user's device; and
   selecting web content for display based on the detected type and national origin.

4. The method of claim 3, wherein the selecting includes querying a reference database and using asynchronous JavaScript and AJAX to display the selected web content based on the detected type and the national origin.

5. The method of claim 1, the displaying further comprising:
   embedding the CTA in a display advertisement, wherein the display advertisement is featured on one or more third-party websites.

6. The method of claim 1, the processing further comprising:
   parsing the subject line of the e-mail message to isolate the code;
   mapping the code to the campaign associated with the CTA; and
   associating the user's e-mail address with the campaign.

7. The method of claim 1, the processing further comprising:
   selecting the associated privacy policy based at least in part on the code, wherein the selected associated privacy policy is determined based on a national origin associated with the user's device.

8. The method of claim 1, wherein the campaign conforms to the associated privacy policy corresponding to the jurisdiction.

9. A system, comprising:
   a memory; and
   at least one processor coupled to the memory and configured to:
   receive a request from a user's device to display web content;
   display on the user's device the requested web content and a call to action (CTA) that, when selected by the user: opens an e-mail client associated with the user's device; generates an electronic message based at least in part on the selected CTA; and populates a recipient address and a code associated with the CTA within the electronic message; and
   process the electronic message upon its receipt by enrolling the user in a campaign associated with the CTA based at least in part on the code and the user's e-mail address, wherein the campaign corresponds to a jurisdiction; and
   generate and send an electronic message to the user's e-mail address, the electronic message comprising a first hyperlink to the campaign associated with the CTA and a second hyperlink to an associated privacy policy corresponding to the jurisdiction.

10. The system of claim 9, wherein the user's device comprises a mobile device equipped with a default e-mail client, the default e-mail client configured to generate an electronic message in response to selection of hypertext or hypermedia including a mailto anchor.

11. The system of claim 9, the at least one processor when configured to receive being further configured to:
    detect a type of web client and a national origin associated with the user's device; and
    select web content for display based on the detected type and national origin.

12. The system of claim 11, the at least one processor when configured to select being further configured to:
    query a reference database and use asynchronous JavaScript and AJAX to display the selected web content based on the detected type and the national origin.

13. The system of claim 9, the at least one processor when configured to display being further configured to:
    embed the CTA in a display advertisement, wherein the display advertisement is featured on one or more third-party websites.

14. The system of claim 9, the at least one processor when configured to process being further configured to:

parse the subject line of the e-mail message to isolate the code;

map the code to the campaign associated with the CTA; and associate the user's e-mail address with the campaign.

15. The system of claim 9, the at least one processor when configured to process being further configured to:

select the associated privacy policy based at least in part on the code, wherein the selected associated privacy policy is determined based on a national origin associated with the user's device.

16. A tangible computer-readable device having instructions stored thereon that, when executed by at least one computing device, causes the at least one computing device to perform operations comprising:

receiving a request from a user's device to display web content;

displaying on the user's device the requested web content and a call to action (CTA) that, when selected by the user: opens an e-mail client associated with the user's device; generates an electronic message based at least in part on the selected CTA; and populates a recipient address and a code associated with the CTA within the electronic message; and processing the electronic message upon its receipt by enrolling the user in a campaign associated with the CTA based at least in part on the code and the user's e-mail address, wherein the campaign corresponds to a jurisdiction; and generating and sending an electronic message to the user's e-mail address, the electronic message comprising a first hyperlink to the campaign associated with the CTA and a second hyperlink to an associated privacy policy corresponding to the jurisdiction.

17. The computer-readable device of claim 16, the operation of receiving further comprising:

detecting a type of web client and a national origin associated with the user's device; and selecting web content for display based on the detected type and national origin.

18. The computer-readable device of claim 17, the operation of selecting further comprising:

querying a reference database and using asynchronous JavaScript and AJAX to display the selected web content based on the detected type and the national origin.

19. The computer-readable device of claim 16, the operation of displaying further comprising:

embedding the CTA in a display advertisement, wherein the display advertisement is featured on one or more third-party websites.

20. The computer-readable device of claim 16, the operation of processing further comprising:

parsing the subject line of the e-mail message to isolate the code;

mapping the code to the campaign associated with the CTA; and associating the user's e-mail address with the campaign.

21. The computer-readable device of claim 16, the operation of processing further comprising:

selecting the associated privacy policy based at least in part on the code, wherein the selected associated privacy policy is determined based on a national origin associated with the user's device.

\* \* \* \* \*